Sept. 16, 1958  G. E. MOONAN  2,852,348
APPARATUS FOR PREPARING RESIDUAL LIQUOR
Filed April 5, 1954  3 Sheets-Sheet 1
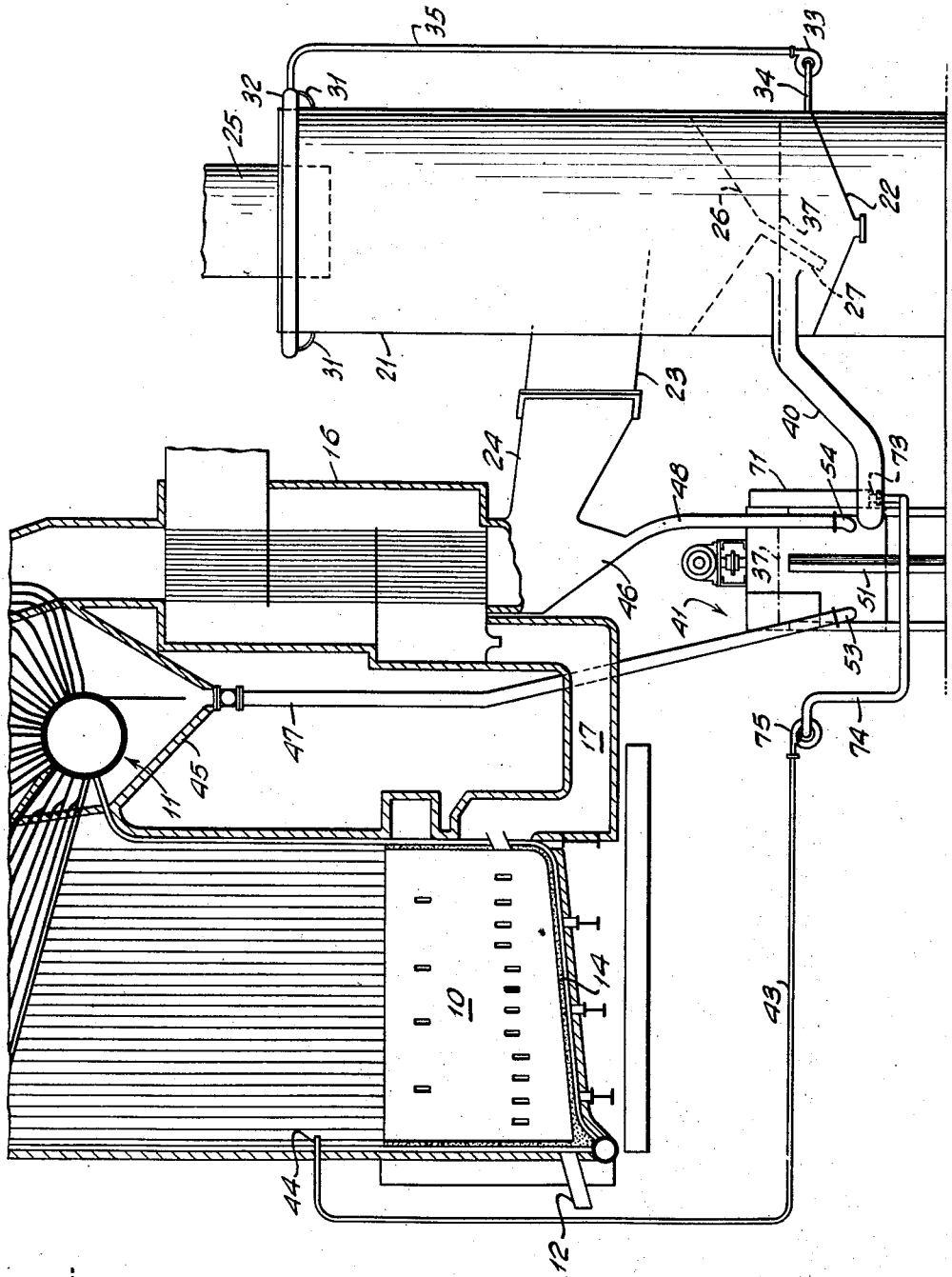
Fig. 1.
INVENTOR
GEORGE E. MOONAN
BY
ATTORNEY Sept. 16, 1958   G. E. MOONAN   2,852,348
APPARATUS FOR PREPARING RESIDUAL LIQUOR
Filed April 5, 1954   3 Sheets-Sheet 2
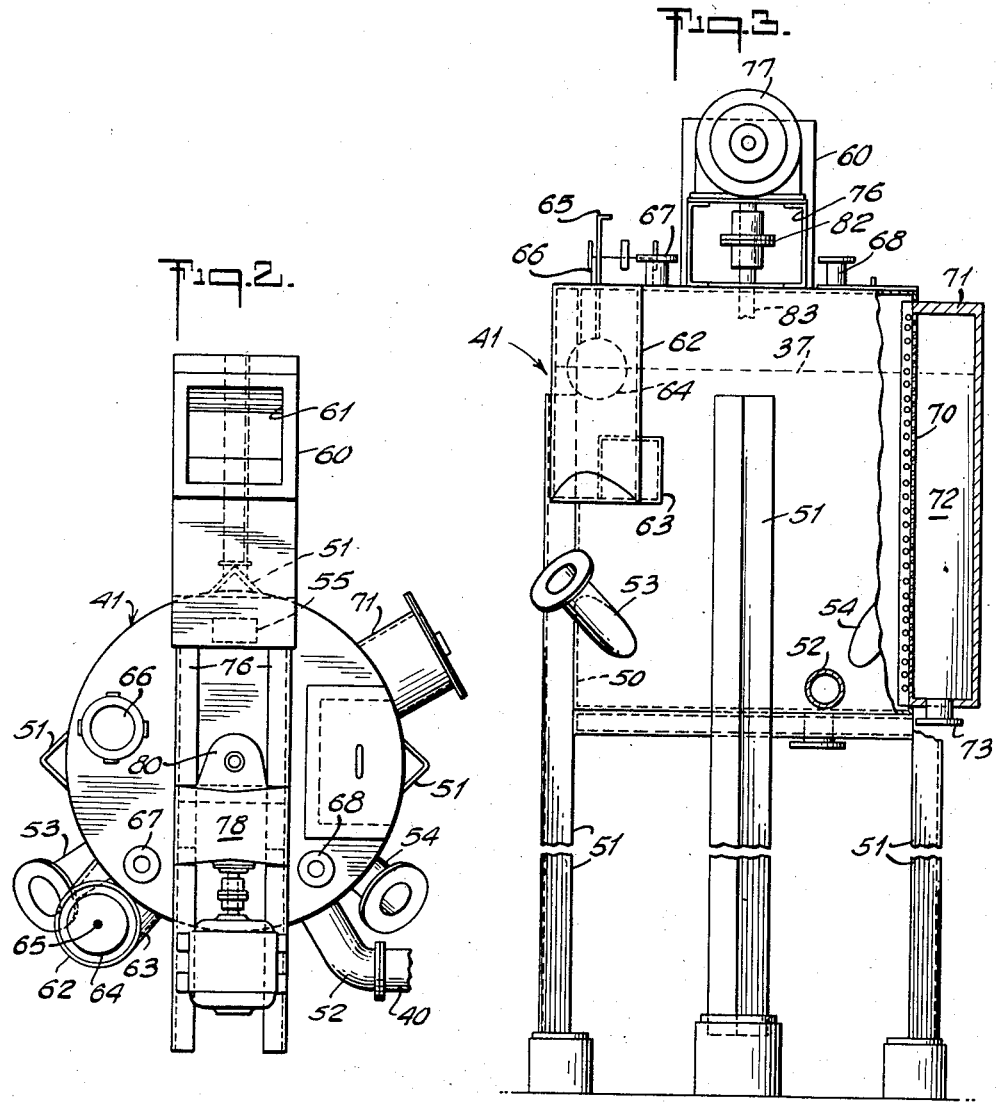
INVENTOR
GEORGE E. MOONAN
BY
ATTORNEY Sept. 16, 1958 G. E. MOONAN 2,852,348
APPARATUS FOR PREPARING RESIDUAL LIQUOR
Filed April 5, 1954 3 Sheets-Sheet 3
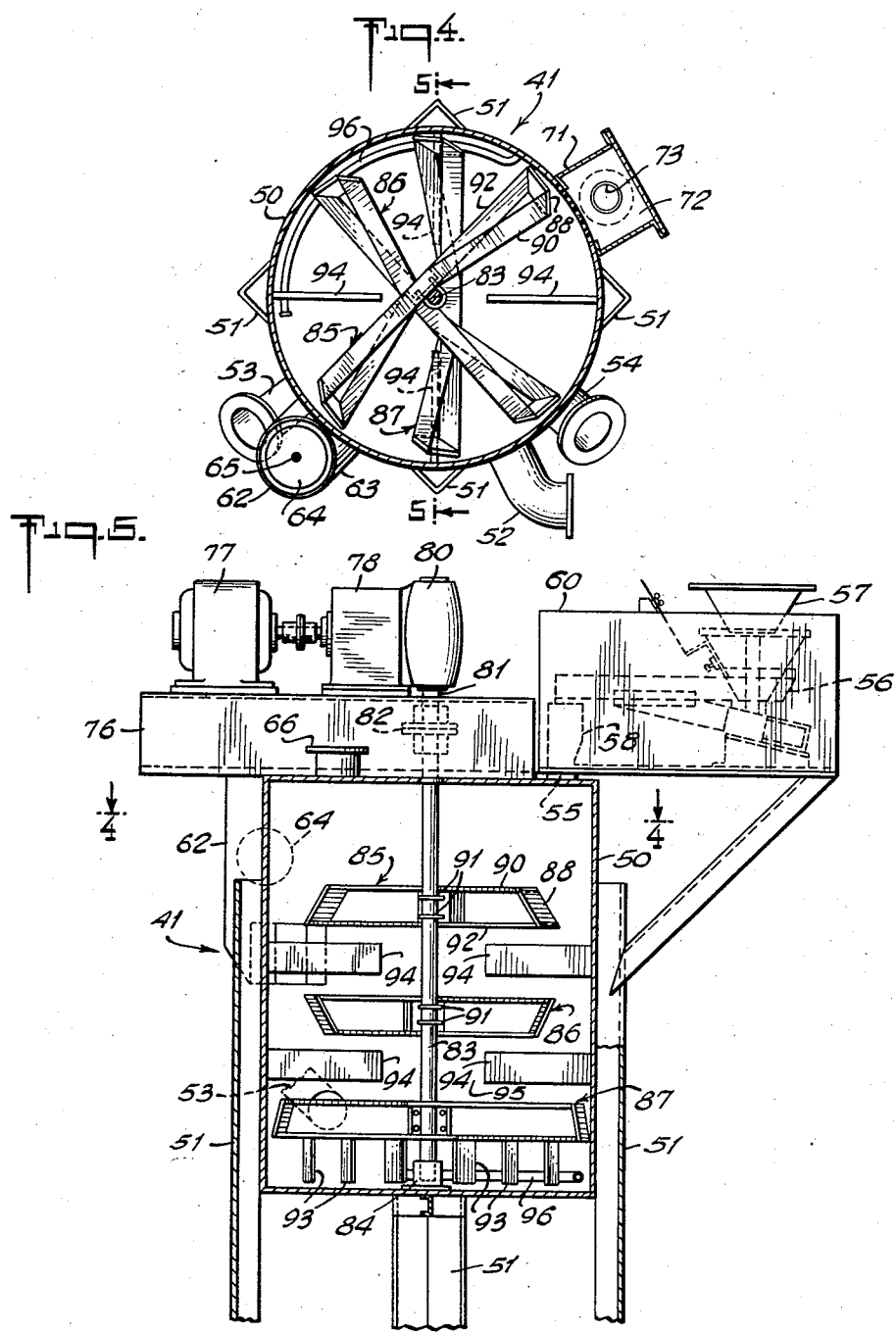
INVENTOR
GEORGE E. MOONAN
BY
ATTORNEY United States Patent Office 2,852,348
Patented Sept. 16, 1958

2,852,348

APPARATUS FOR PREPARING RESIDUAL LIQUOR

George E. Moonan, Crestwood, N. Y., assignor to The Babcock & Wilcox Company, New York, N. Y., a corporation of New Jersey Application April 5, 1954, Serial No. 421,037

5 Claims. (Cl. 23—262)

The present invention relates to apparatus for the size reduction of solids entrained in a flowing stream of liquid, and more particularly to a mechanical device arranged to disintegrate lumps of solid materials present in a stream of pulp residual liquor prior to the incineration of the liquor in a chemical recovery furnace.

In the recovery of chemicals from a wood pulping process, residual liquor containing inorganic chemicals and combustible organic matter, such as, for example, the black liquor of the kraft or sulfate process of manufacturing paper pulp, is concentrated to a solid content of 40–70% and its combustible constituents burned in a furnace to recover the included inorganic chemicals and to generate heat for absorption in an associated heat exchange apparatus. Ordinarily, the residual liquor obtained from the pulp washers is partially concentrated in multiple effect evaporators, while final liquor concentration is obtained by direct contact between the partially concentrated liquor and the gaseous products of combustion resulting from the incineration of concentrated liquor. The concentrated liquor is thereafter delivered to a mixing tank where make-up chemicals, for example salt cake, may be added and the liquor pumped to the furnace for incineration.

The great majority of modern chemical recovery furnaces used in wood pulping processes are arranged for incineration of the residual liquor, in for example, the general type of furnace shown in U. S. Patent 2,161,110. In such systems, the concentrated liquor is delivered to one or more oscillating nozzles positioned in a wall of the furnace and arranged to project the liquor into the furnace in the form of a spray.

While the finally concentrated residual liquor delivered to the furnace spray nozzle must contain 40% or more of solids so that the combustion thereof will be self-sustaining, the individual particles of solids must be small enough to avoid pluggage of the spray nozzle orifice or the connecting piping. The direct contact evaporative concentration of the liquor may be a source of the formation of lumps of solid material. Sometimes lumps may be introduced into the system from the dust hoppers of the associated vapor generating system, or by the addition of make-up chemicals such as salt cake or the like. Whatever the source of the lumps, their presence in the concentrated liquor passed to the incinerating furnace must be eliminated to avoid pluggage of the nozzles and piping.

In accordance with the present invention a new and novel mixing and preparing tank for liquor containing solids, as hereinafter described, is inserted in the concentrated liquor flow circuit leading to the nozzles of the incinerating furnace of a chemical recovery furnace. Provision is made for the direct introduction of make-up chemicals, sludge from the system, such as the multiple effect evaporators, and dust from the hoppers of a steam generating unit associated with the incinerating furnace, into my novel tank. The liquid and solid materials delivered to the mixing tank are subjected to the agitating effect of a plurality of rotating and stationary arms which are specially constructed and arranged to thoroughly mix the materials. The rotating arms of the mixing tank cooperate with a vertically positioned screen in a wall of the tank whereby the solid lumps suspended in the liquor are retained in the tank until their size has diminished sufficiently by abrasion, scraping, erosion and dissolving actions to pass through the screen. While the agitation of the mixture is usually sufficient to eventually reduce the size of the lumps, the interaction of the rotating and fixed arms in the tank have some mechanical action on the particularly larger lumps and assist in the size reduction of the solids in the mixture.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which a practical embodiment of the invention has been illustrated and described.

Of the drawings:

Fig. 1 is a partially diagrammatic elevation view of a chemical and heat recovery unit incorporating the present invention;

Fig. 2 is a plan view of the mixing tank of the present invention;

Fig. 3 is an elevation view, partly in section, of the mixing tank; and

Figs. 4 and 5 are sections taken on line 4—4 of Fig. 5, and on line 5—5 of Fig. 4, respectively, of the mixing tank.

In general, as shown in Fig. 1, a typical furnace 10 for the incineration of residual liquor is associated with a vapor generator 11 for the recovery of the high level sensible heat in the gases of combustion. A major portion of the inorganic chemicals contained in the residual liquor is recovered during the incineration of the liquor in the form of a chemical smelt which is discharged through a spout 12 at the lower end of an inclined hearth 14 on the furnace bottom. From the spout the smelt falls into a dissolving tank from which it is pumped to the usual causticizing plant (not shown) and prepared for reuse in the pulping process.

After the gases produced in the furnace 10 have given up a major portion of their heat in the vapor generator, the gases are passed through a tubular type air heater 16, and thence through a direct contact type of liquor concentrating device. In the air heater the gases heat combustion air by indirect contact heat exchange therewith, with the heated air passing through a duct system 17 for controlled admission into the furnace. Part of the remaining sensible heat in the gases is utilized in a direct contact evaporator to concentrate residual liquor prior to its incineration. In some installations the flue gases leaving the vapor generator pass directly to a direct contact liquor evaporator, and the combustion air is preheated by other means, such as a steam-coil heater.

Any of the well known types of direct contact evaporators may be used. However, as shown in Fig. 1, the evaporator 20 is of the cyclone type disclosed and claimed in the U. S. patent of Tomlinson et al., No. 2,590,905, issued April 1, 1952. The shell 21 of the evaporator is cylindrical with an inverted frusto-conical bottom 22, and is provided with a tangential gas inlet 23 located intermediate its vertical height and in communication with the air heater 16 through the duct 24. Residual liquor which has been partially concentrated in a battery of multiple effect evaporators (not shown) is sprayed into the tangential gas inlet 23 to intimately mix with the entering relatively hot gases. The gases, with entrained liquor spray, pass upwardly along the wall of the evaporator shell 21 in a helical flow path toward an axially arranged outlet duct 25. With the interior surface of the shell 21 wetted with a downwardly moving film of recirculated liquor, liquor droplets and entrained solids separated from the gas stream by centrifugal force join the film of liquor on the interior surface of the shell and flow toward the bottom of the evaporator. The concentrated liquor is collected in an inverted frusto-conical basin 26 spaced above the evaporator bottom and is discharged through a pipe 27 into a pool of liquor maintained within the lower portion of the shell 21.

The "wetted wall" effect of the film of liquor flowing downwardly on the inner surface of the evaporator shell is obtained by a plurality of nozzles arranged to spray liquor tangentially against the upper portion of the internal surface of the shell. The nozzles receive recirculated liquor through pipes 31 from an annular manifold 32 encircling the upper end of the shell 21. A pump 33 withdraws concentrated liquor from the pool maintained in the bottom of the evaporator through a pipe 34 and discharges liquor through a pipe 35 into the manifold 32. The gases leaving the evaporator change their direction of flow to pass through the axially positioned duct 25, and thence through an induced draft fan (not shown).

The pool of liquor in the bottom portion of the evaporator is maintained at a selected level, such as at 37, by regulation of the amount of partially concentrated or make-up liquor sprayed into the inlet duct 23. A conduit 40 connects the liquor pool in the bottom portion of the evaporator with a mixing tank 41.

The tank 41 is cylindrical and is provided with a motor driven agitator as hereinafter described, to maintain the concentrated liquor therein in a flowable condition, to reduce the size of the solids and to avoid separation of solids from the liquid. From the mixing tank, the liquid is pumped through a pipe 43 to the spray nozzle 44 in the furnace wall in accordance with liquor furnace requirements. Any make-up chemical, such as salt cake or the like, is added to the liquor in the mixing tank 41. In most installations, some of the dust entrained with the gases leaving the furnace 10 is collected at the lower end portions of the gas-passes within the vapor generator 11 and at the lower end of the air heater 16. In Fig. 1, dust hoppers 45 and 46 collect any dust deposited in the lower portions of the vapor generator and air heater respectively. Since the collected dust contains a high percentage of valuable chemicals, each hopper is provided with dust discharge means such as spouts 47 and 48, respectively connected with the mixing tank 41, so that the dust may be returned to the furnace with the liquor for smelting, and subsequent recovery.

Ordinarily, the solids in the concentrated liquor obtained from the cyclone evaporator 20 are well dispersed in the liquor and are not lumpy. However, under unusual evaporator operating conditions, such as during an interruption in the supply of partially concentrated liquor to the evaporator, lumps of solids may be formed, to accumulate in the concentrated liquor delivered to the mixing tank 41 and pumped to the furnace spray nozzle 44. Other types of direct contact evaporators are also apt to cause the formation of solid lumps in the concentrated liquor delivered to the mixing tank. The recovered dust from the hoppers 45 and 46, which is added to the liquor in the mixing tank, is usually in a dry or in a slurry form, but may also tend to deliver lumps to the mixing tank. Many types and forms of chemical compounds may be used as a source of the chemical make-up added to the liquor in the mixing tank. However, the most commonly used source of chemical is salt cake, which may include lumps. Lumps of a size suitable for convenient handling in the conveying and feeding system for delivery to the tank may be used without the need for intervening screens, when used with the present invention.

The mixing tank 41 is shown at an enlarged scale in plan and elevation in Figs. 2 and 3. In the embodiment shown the tank consists of a cylindrical shell 50 mounted above the ground level on four upright angle iron legs 51. The legs are welded to the exterior surface of the shell to provide a rigid support for the shell and the agitator mounted thereon, as hereinafter described. It will be understood that the shell need not be mounted on legs, but can be supported directly on a foundation.

As shown in Figs. 1, 2 and 3, concentrated liquor from the cyclone evaporator 20 flows by gravity through the pipe 40 to enter the shell 50 through the flanged inlet pipe 52 disposed in the lower portion of the mixing tank. The shell is provided with flanged inlet fittings 53 and 54 which are connected to the pipes 47 and 48 respectively, for the admission of dust into the lower portion of the tank from the dust collecting hoppers 45 and 46.

The tank 41 is provided with an opening 55 in the top thereof for the delivery of chemical make-up solids, such as salt cake. As shown in Figs. 2 and 4, the make-up chemicals are delivered by a feeder 56 of the electro-vibrating type whereby the solids are received from an overhead bin (not shown) discharging through a hopper bottom 57 into the inlet opening of the vibrating feeder. The rate of make-up solids delivered by the feeder is controlled in accordance with the chemical requirements of the system, with the solids discharging through a stub spout 58 through the opening in the tank. The feeder 56 is enclosed by a housing 60 having a top opening 61 therein to accommodate the hopper 57.

The mixing tank is provided with a float level control chamber 62 positioned on the exterior of the shell 50 and in communication with the interior of the mixing tank through a duct 63. As shown particularly in Fig. 3, a spherical float 64 rests on the liquor maintained in the tank 41, and as the level of the liquor varies an indicator rod 65 connected with the float will move correspondingly. Since the mixing tank 41 is connected with the sump of the cyclone evaporator 20 by the duct 40 and the flow therebetween is gravitational the liquor level 37 maintained in both the tank 41 and the cyclone 20 will be substantially the same at all times. Thus the float 64 in the float chamber 62 of the mixing tank 41 is used merely as an indicator for the convenience of the operator, while the usual automatic controls are used to regulate the delivery of weak liquor to the cyclone evaporator in accordance with variations in the level therein. It is understood the float 64 may be used for the primary regulation of liquor level in the tank 41. The mixing tank is further provided with the usual vent opening 66, and flanged pipes 67 and 68 for the admission of washing liquid when needed. The tank is also provided with a drain pipe in the bottom thereof.

Referring particularly to Figs. 3 and 4, a perforated panel 70 or screen is inserted in one segment of and extending substantially the full height of the shell 50. Walls 71 enclose the exterior side of the perforated panel 70 to provide a closed liquor outlet chamber 72 on the outside of the mixing tank 41. The chamber is provided with a flanged outlet pipe 73 which is connected with a pipe 74 leading to the suction side of the pump 75 which discharges into the pipe 43 for the delivery of liquor to the spray nozzle 44. As hereinafter described, the liquor is continuously agitated within the mixing tank so as to dissolve and break up the solid lumps in the concentrated liquor. The concentrated liquor passing through the openings of the perforated panel 70 will have the solids therein limited in size to the openings of the perforations in the panel. The agitator of the present invention is constructed and arranged to prevent the accumulation of solids in the openings of the perforated panel and to thereby prevent pluggage of any part of the liquor flow circuit.

The drive mechanism for the agitator is mounted upon parallel channels 76 supported on the top of the mixing tank 41. The drive consists of an electric motor 77 connected with a speed reducer 78 and a spur gear 80 with right angle off-take shaft 81. The shaft 81 is connected through a flexible coupling 82 with a vertically arranged agitator shaft 83 mounted in a bearing 84 positioned at the bottom of the mixing tank 41. The agitator shaft is generally coaxial with the vertical axis of the shell 50, and is rotated at a relatively low speed.

Referring to Figs. 4 and 5, three vertically spaced horizontally disposed agitator arms 85, 86 and 87 are attached to the agitator shaft 83 with the arms positioned so that the ends thereof rotate through an arc closely spaced from the panel 70 and clear the circumference of the shell 50. In the embodiment shown, the agitator arms are formed from a pair of steel bars 88 and 90 which are welded to a channel and clamped to the shaft by means of a pair of U bolts 91. The bars are welded to an end plate 92 of a parallelogram configuration. The assembly of each arm is such as to form a device which during rotation tends to cause an upward movement of the concentrated liquor and solid lumps maintained along the outer periphery of shell 50.

The lowermost arm 87 is provided with a plurality of depending radial vanes 93 which are welded to the bottom of the arm and extend to a position closely spaced from the bottom of the mixing tank. The vanes are spaced radially of the tank to traverse the entire cross-section of the tank. A set of four plate members 94 are positioned upwardly adjacent the lowermost rotating arm 87. The members 94 are radially arranged to extend inwardly from equally spaced circumferential positions on the shell. The inner end of each of the plate members 94 is spaced outwardly of the shaft 83 to provide a central opening 95 between the shaft 83 and the plates. The intermediate arm 86 of the agitator is spaced above the fixed plate members 94, and is in turn spaced from a second set of stationary plates 96 which is spaced between the intermediate arms 86 and the upper arms 85.

A steam pipe 96 is positioned adjacent the bottom circumference of the tank for the admission of steam thereto, since it is sometimes desirable to heat the liquor in the tank 41 to change the liquor viscosity and to assist in dissolving lumps.

In the operation of the described apparatus the concentrated liquor delivered to the mixing tank 41 is mixed with make-up chemicals and dust from the vapor generator by the agitating action of the revolving arms 85, 86 and 87. The rotation of the arms causes a movement of the liquor through a tortuous path as directed by the movement of the arms in cooperation with the stationary plates 94 and 96. The general movement of the liquor with entrained solids is upward at the circumference of the tank and downward through the center portion of the tank. Any lumps in the liquor pass through the agitating path of the liquor movement so as to be continuously exposed to the dissolving action of the liquor. As liquor is withdrawn from the tank through the perforated panel 70 by the pump 75, the size of the lumps is limited by the openings in the panel. Any lumps that are too large to pass through the perforations are swept away from the panel by the action of the rotating arms. Some abrading, scraping, and erosion of the lumps may be accomplished between the rotating arms and the plates 94 and 96, as well as between the ends of the arms 85, 86 and 87 and the inner surface of the shell 50 including the panel 70.

Advantageously a change in the liquor flow rate to the nozzle 44 has little effect upon the level of the liquor in the tank since the volume of liquor maintained in the evaporator 20 and the tank 41 is sufficient to provide a surge quantity of liquor to accommodate the limits of practical liquor flow rate changes to the furnace.

I claim:

1. A mixing and preparing tank for the preparation of residual liquor for incineration in a chemical recovery system comprising a closed vessel of circular horizontal cross-section, means for introducing residual liquor and solids into said vessel, a perforated panel forming a segment of the wall of said vessel, means enclosing the exterior surface of said perforated panel and defining a liquor outlet chamber therebetween, a rotatable shaft positioned axially of said vessel, means for rotating said shaft, a plurality of vertically spaced horizontally disposed arms clamped to said shaft, the ends of said arms having a radial length slightly less than the radius of curvature of said perforated panel, and a plurality of horizontally disposed plate members attached to the wall of said vessel and vertically spaced between said horizontally disposed arms.

2. A mixing and preparing tank for the preparation of residual liquor for incineration in a chemical recovery system comprising a closed vessel of circular horizontal cross-section, means for introducing residual liquor and chemical solids into said vessel, a perforated panel forming a segment of the wall of said vessel, means enclosing the exterior surface of said perforated panel and defining a liquor outlet chamber therebetween, a rotatable shaft positioned axially of said vessel, means for rotating said shaft, a plurality of horizontally disposed arms clamped to said shaft, said arms each including a pair of spaced bars with the end portion of one bar bent in a horizontal direction and the end portion of the other bar bent in the opposite direction in its horizontal plane, and a parallelogram plate connecting the adjacent ends of each of said bars, each of said plates moving in a path closely adjacent the inner surface of said perforated panel.

3. A mixing and preparing tank for the preparation of residual liquor for incineration in a chemical recovery system comprising a closed vessel of circular horizontal cross-section, means for introducing residual liquor and solids into said vessel, a perforated panel forming a segment of the wall of said vessel, means enclosing the exterior surface of said perforated panel and defining a liquor outlet chamber therebetween, a rotatable shaft positioned axially of said vessel, means for rotating said shaft, means forming a plurality of vertically spaced horizontally disposed arms clamped to said shaft, said arms each including a pair of attached vertically spaced horizontally extending bars with the end portion of one bar bent in a horizontal plane and the opposite end portion of the other bar bent in its horizontal plane, the adjacent ends of said connected bars positioned for rotation closely adjacent said perforated panel, and a plurality of horizontally disposed upright plate members attached to the wall of said vessel and vertically spaced between said horizontally disposed arms.

4. The combination comprising walls defining a furnace for the incineration of a pulp residual liquor, liquor spray nozzle means positioned in a wall of said furnace, direct contact evaporator means for concentrating said liquor prior to its incineration in said furnace, liquor flow confining means connecting said evaporator means with said spray nozzle means including a pump discharging to said spray nozzle means, a mixing tank positioned between said evaporator means and said pump in said liquor flow confining means, said tank adapted to receive liquor by gravity flow from said evaporator means and to maintain a liquor level therein common with the liquor level in said evaporator means, a perforated panel in a wall of said vessel, means on the exterior wall of said vessel enclosing said perforated panel and defining a liquor outlet chamber therebetween, and a plurality of vertically spaced rotating arms within said vessel operable to agitate the liquor therein, and to remove any accumulation of solids from the inner surface of said perforated panel.

5. The combination comprising walls defining a furnace for the incineration of a pulp residual liquor, liquor spray nozzle means positioned in a wall of said furnace, evaporator means for concentrating said liquor prior to its incineration in said furnace, liquor flow confining means connecting said evaporator means with said spray nozzle means including a pump discharging to said spray nozzle means, a mixing tank positioned between said evaporator means and said pump in said liquor flow confining means, said tank adapted to receive liquor by gravity flow from said evaporator means and to maintain a liquor level therein common with the liquor level in said evaporator means, means for defining a liquor outlet chamber from said tank, a perforated panel positioned in said wall and having substantially the same configuration as the curvature thereof, a plurality of vertically spaced rotating arms within said vessel operable to agitate the liquor therein and to remove solids accumulating on the perforated panel, and a plurality of horizontally disposed stationary plate members positioned between said vertically spaced arms.

References Cited in the file of this patent

UNITED STATES PATENTS

| | | |
|---|---|---|
| 453,678 | Theurer | June 9, 1891 |
| 1,131,222 | Dorr | Mar. 9, 1915 |
| 2,340,154 | Stone et al. | Jan. 25, 1944 |
| 2,583,145 | Hochmuth | Jan. 22, 1952 |
| 2,590,541 | Johnson et al. | Mar. 25, 1952 |
| 2,626,786 | McGlothlin | Jan. 27, 1953 |